United States Patent
Seo et al.

(10) Patent No.: US 12,073,159 B2
(45) Date of Patent: Aug. 27, 2024

(54) COMPUTING DEVICE AND METHOD FOR DETECTING CLOCK DOMAIN CROSSING VIOLATION IN DESIGN OF MEMORY DEVICE

(71) Applicant: SAMSUNG ELECTRONICS CO., LTD., Suwon-si (KR)

(72) Inventors: Hyungjung Seo, Suwon-si (KR); Youngrok Choi, Seoul (KR); Sojung Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 548 days.

(21) Appl. No.: 17/475,107

(22) Filed: Sep. 14, 2021

(65) Prior Publication Data
US 2022/0327269 A1    Oct. 13, 2022

(30) Foreign Application Priority Data
Apr. 13, 2021 (KR) .......... 10-2021-0047663

(51) Int. Cl.
G06F 30/30 (2020.01)
G06F 30/327 (2020.01)
G06F 30/3312 (2020.01)
G06F 30/3323 (2020.01)

(52) U.S. Cl.
CPC ........ G06F 30/3312 (2020.01); G06F 30/327 (2020.01); G06F 30/3323 (2020.01)

(58) Field of Classification Search
CPC .............. G06F 30/3312; G06F 30/327; G06F 30/3323; G06F 30/3315; G06F 2119/12; G06F 30/396; G06F 30/398; G06F 2115/06; G06F 30/3308
See application file for complete search history.

(56) References Cited

U.S. PATENT DOCUMENTS

| | | | |
|---|---|---|---|
| 8,271,918 B2 | 9/2012 | Kwok et al. | |
| 8,407,636 B2 | 3/2013 | Iwashita | |
| 9,304,530 B1 * | 4/2016 | Ware | G06F 1/10 |
| 9,547,732 B2 | 1/2017 | Drasny et al. | |
| 9,552,175 B2 * | 1/2017 | Takefman | G06F 21/71 |
| 9,990,453 B2 * | 6/2018 | Gupta | G01R 31/317 |
| 10,204,201 B1 | 2/2019 | Loh et al. | |
| 10,366,186 B2 | 7/2019 | Mautner et al. | |
| 10,861,515 B2 * | 12/2020 | Kwak | G11C 11/34 |
| 10,878,153 B1 | 12/2020 | Senapati et al. | |
| 2016/0259879 A1 | 9/2016 | Ganai et al. | |

* cited by examiner

*Primary Examiner* — Jack Chiang
*Assistant Examiner* — Brandon Bowers
(74) *Attorney, Agent, or Firm* — MORGAN, LEWIS & BOCKIUS LLP (57) ABSTRACT

A method of operating a computing device for detecting clock domain crossing (CDC) violation in a design of a memory device, the method includes parsing a Netlist to generate a circuit database, parsing a clock tree using the circuit database to generate a clock tree database, extracting a non-toggled point using the clock tree database to generate a false path database based on the non-toggled point, and extracting a CDC violation identified from one or more simulation waveforms using the clock tree database and the false path database.

20 Claims, 8 Drawing Sheets

| Type | Point | Pair |
|---|---|---|
| CDC : Data-Clk | 14 | 14 |
| RDC : Set-Clk | 80 | 90 |
| RDC : Reset-Clk | 14 | 14 |
| RDC : Set-Reset | – | – |
| Multi-Input Gate | 91 | 277 |
| Total | 189 | 385 |

COMPUTING DEVICE AND METHOD FOR DETECTING CLOCK DOMAIN CROSSING VIOLATION IN DESIGN OF MEMORY DEVICE

CROSS-REFERENCE TO RELATED APPLICATION

This application claims benefit of priority to Korean Patent Application No. 10-2021-0047663 filed on Apr. 13, 2021 in the Korean Intellectual Property Office, the inventive concept of which is incorporated herein by reference in its entirety.

BACKGROUND

The present inventive concept relates to a computing device for detecting a clock domain crossing violation in a design of a memory device and a method for the same.

In general, integrated circuits have tens or hundreds of asynchronous clock domains. Therefore, verification of clock domain crossing (CDC) using a conventional register transfer level (RTL) simulation and static timing analysis (STA) may be difficult. The conventional RTL simulation or STA typically includes metastability that may cause a transmission problem in an asynchronous clock boundary.

SUMMARY

Some embodiments of the present inventive concept provide a computing device for verifying a clock domain crossing violation in a design of a memory device for verifying a novel CDC violation and a method having the same.

Some embodiments of the present inventive concept provide a computing device for detecting a clock domain crossing violation in a design of a memory device for removing CDC violation noise and a method for the same.

In a method of operating a computing device for detecting clock domain crossing (CDC) violation in a design of a memory device, the method includes parsing a Netlist to generate a circuit database, parsing a clock tree using the circuit database to generate a clock tree database, extracting a non-toggled point using a clock tree database to generate a false path database based on the non-toggled point, and extracting a CDC violation identified from one or more simulation waveforms using the clock tree database and the false path database.

A computing device for implementing electronic design automation in a design of a memory device, the computing device includes a processor configured to execute a simulation tool and a clock domain crossing (CDC) tool, a storage device for storing the simulation tool and the CDC tool, a working memory for loading the simulation tool and the CDC tool stored in the storage device, and an input/output device for outputting a result of the simulation tool and the CDC tool that were executed to the processor. The processor is configured to exclude, from CDC analysis by the CDC tool, a point without a toggle of a signal by parsing a Netlist by the simulation tool, detect CDC violations by performing static timing analysis in the CDC tool, and detect a CDC violation path by matching a simulation waveform according to analysis of the simulation tool to the CDC violations.

A computer program product of a computing device for electronic design automation in a design of a memory device, the computer device including a processor for executing at least one instruction, and a memory for storing the at least one instruction, the computer program product includes at least one instruction. Upon execution of the at least one instruction, the processor is configured to perform operations including parsing a Netlist to generate a circuit database, parsing a clock tree using the circuit database to generate a clock tree database, extracting a non-toggled point using the clock tree database to generate a false path database based on the non-toggled point, and extracting a clock domain crossing (CDC) violation identified from a simulation waveform using the clock tree database and the false path database.

BRIEF DESCRIPTION OF DRAWINGS

The above and other aspects, features and other advantages of the present inventive concept will be more clearly understood from the following detailed description taken in conjunction with the accompanying drawings, in which:

Referring to FIG. 9, the process of parsing the Netlist may proceed as follows.

DETAILED DESCRIPTION

Hereinafter, example embodiments in the present inventive concept will be described in detail with reference to the accompanying drawings.

Figure 1:
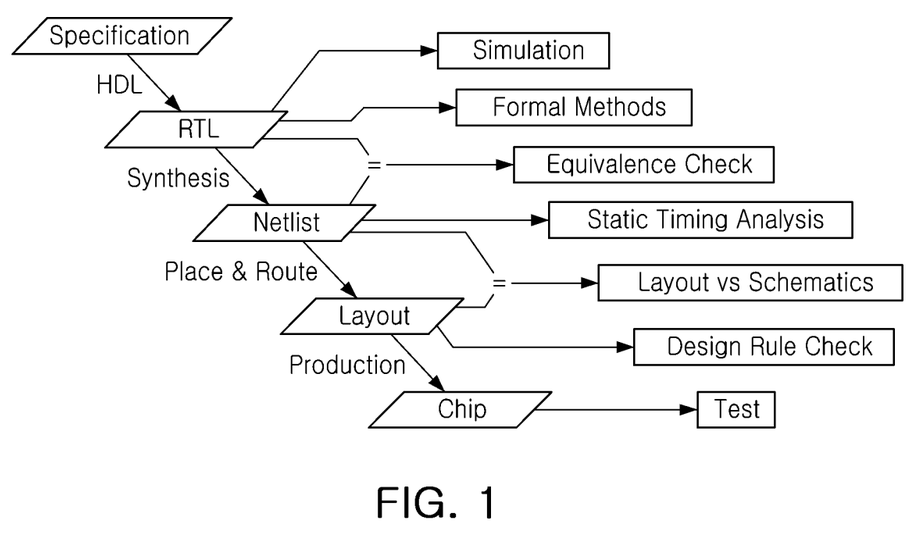
FIG. 1 is a diagram illustrating a general hardware design flow.

FIG. 1 is a diagram illustrating a flow of a general hardware design. Referring to FIG. 1, in a general digital hardware design, a Register Transfer Level (RTL) design is generated according to a specification, a Netlist design is generated, a layout design is generated, and a chip is manufactured using layout data from the layout design, and a test of the manufactured chip is performed. In general, the specification describes requirements for respective functions of hardware components. The functions described in the specification are described using a Hardware Description Language (HDL) such as Verilog or a Very High-Speed Integrated Circuit Hardware Description Language (VHDL). In the Register Transfer Level (RTL) design stage, hardware components with modularity and flexibility may be designed. Each of the components is connected to a description library with timing constraints related to voltage and environmental factors. In a Netlist design stage, by verifying equivalence between the RTL design and the Netlist design, it is verified that the designed function is not modified by synthesis. In addition, a timing between the components is verified using static timing analysis (STA). Each component of the technology library is mapped to an analog model described using layers (e.g., silicon-based semiconductors). Thereafter, components are disposed in a predetermined region, and are routed (interconnected) to a metal layer. In the layout design stage, an overall layout is compared with the Netlist design through layout-to-circuit or layout versus schematic (LVS) verification. Specifically, the drawn shapes of the layout that represent the electrical components of the circuit, as well as the connections between them are verified against the schematic or netlist. In addition, it may be verified as to whether a layout designed through a design rule check (DRC) can be manufactured. Thereafter, a chip is manufactured according to the designed layout, that is, the layout data. Thereafter, a test of the chip that has been manufactured is performed.

Meanwhile, a custom design may be performed according to a similar process after a gate unit circuit is completed, except that there is a difference in a design method and circuit representation from the RTL design in some stages of the circuit design described in FIG. 1. A high level design (HLD) of a memory device may be performed using a computing device. A circuit designed by HLD may be expressed more specifically by RTL coding or a simulation. A code generated by RTL coding may be converted into a Netlist, and may be disposed and synthesized into an entire semiconductor memory. A synthesized schematic circuit may be verified by a simulation tool, and an adjustment process may be performed according to a verification result.

In general, clock domain crossing (CDC) refers to (data transmissions between clock domains operating with different clocks. A CDC signal is defined as a signal latched by a flip-flop in one clock domain and sampled in another asynchronous clock domain. When a signal is transmitted between asynchronous clock domains, a flip-flop setup or hold timing violation may occur. When a signal crossing from one clock domain to another clock domain arrives too close to a receiving clock edge, a state of detestability of the signal may be caused. Since the CDC signal fluctuates, a potentially erroneous signal value may propagate through the design.

Recently, as high-performance, high-capacity dynamic random access memories (DRAM) have been developed, the clocking method has become increasingly complex. Accordingly, the problem of properly handling CDC signals has emerged. However, when a conventional CDC verification methodology is applied to a DRAM circuit design, a large number of CDC violations occur due to the asynchronous clock method. However, many of these CDC violations are noise that do not require circuit modifications.

In the memory design method and the CDC verification method according to example embodiments of the present inventive concept, CDC violation noise may be reduced by associating each crossing of a CDC analysis result with a simulation result for the same circuit.

In the CDC verification method of the memory device according to example embodiments of the present inventive concept, by parsing a Netlist with a simulation tool, a net without a toggle of a signal may be found, and CDC analysis may be performed by excluding the net to detect a violation. In example embodiments, by matching a waveform that is a result of parsing a Netlist by a simulation tool and a CDC violation. The CDC violation may be a result of analyzing a CDC tool with a static methodology, and a CDC violation path may be detected/not detected in this waveform. As a result of this determination, if a CDC violation path is not detected, the corresponding CDC violation may be filtered. In example embodiments, by comparing and analyzing the CDC violation with a simulation waveform, the CDC violation shown in the simulation may be extracted/filtered. Thereby, noise of CDC violations in CDC analysis may be reduced.

In the memory design method and the CDC verification method according to example embodiments of the present inventive concept, CDC violations that are not reproduced in an actual operation by performing a correlation operation of a sharpness problem as a result of CDC analysis of the memory circuit and a dynamic simulation result may be removed. That is, in the CDC verification method of the present inventive concept, the CDC violation output in CDC analysis result may be compared with a simulation result for the same Netlist, and only the result related to the operation detected in the simulation according to the comparison result may be identified.

Specifically, in the CDC verification method according to example embodiments of the present inventive concept, a CDC verification theory is applied to a Netlist to obtain CDC violations, and a simulation is performed on the same Netlist to prepare a waveform. For each of the CDC violations, it is possible to check whether a specific waveform is present, and classify it as a valid/invalid result of the CDC violation according to the presence of the specific waveform.

In example embodiments, for one CDC violation, multiple simulations may be associated. As simulation coverage increases, a coverage for CDC violations may also increase.

Figure 2:
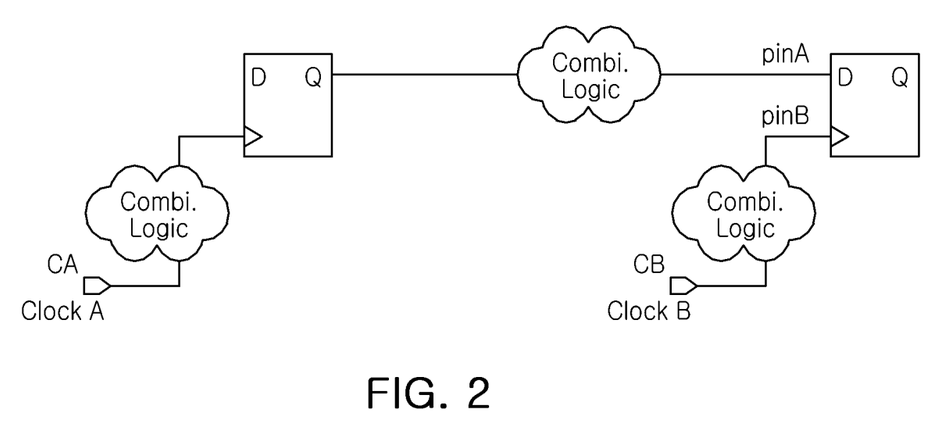
FIG. 2 is a diagram illustrating a CDC timing path according to example embodiments of the present inventive concept.

FIG. 2 is a diagram illustrating a CDC timing path according to example embodiments of the present inventive concept. Referring to FIG. 2, a CDC violation is expressed as a gate-level. A circuit is traversed from the corresponding sources for a predetermined asynchronous clock (Clock A and Clock B). In this case, when two clocks arrive at a first pin (pin A) and a second pin (pin B) respectively of a target circuit comparing a delay of a signal, it is determined as a CDC violation. The CDC violation may be expressed as continuation of all cells/net/pins from a clock source to the first and second pins (pin A, pin B) of the target circuit. Clock A and Clock B respectively arrive at the first pin and the second pin of the target circuit through corresponding first and second synchronization circuits.

In the following description, this will be known as a source clock path from a first clock terminal CA to a first pin (pin A), and a destination clock path from a second clock terminal CB to a second pin (pin B).

Figure 3:
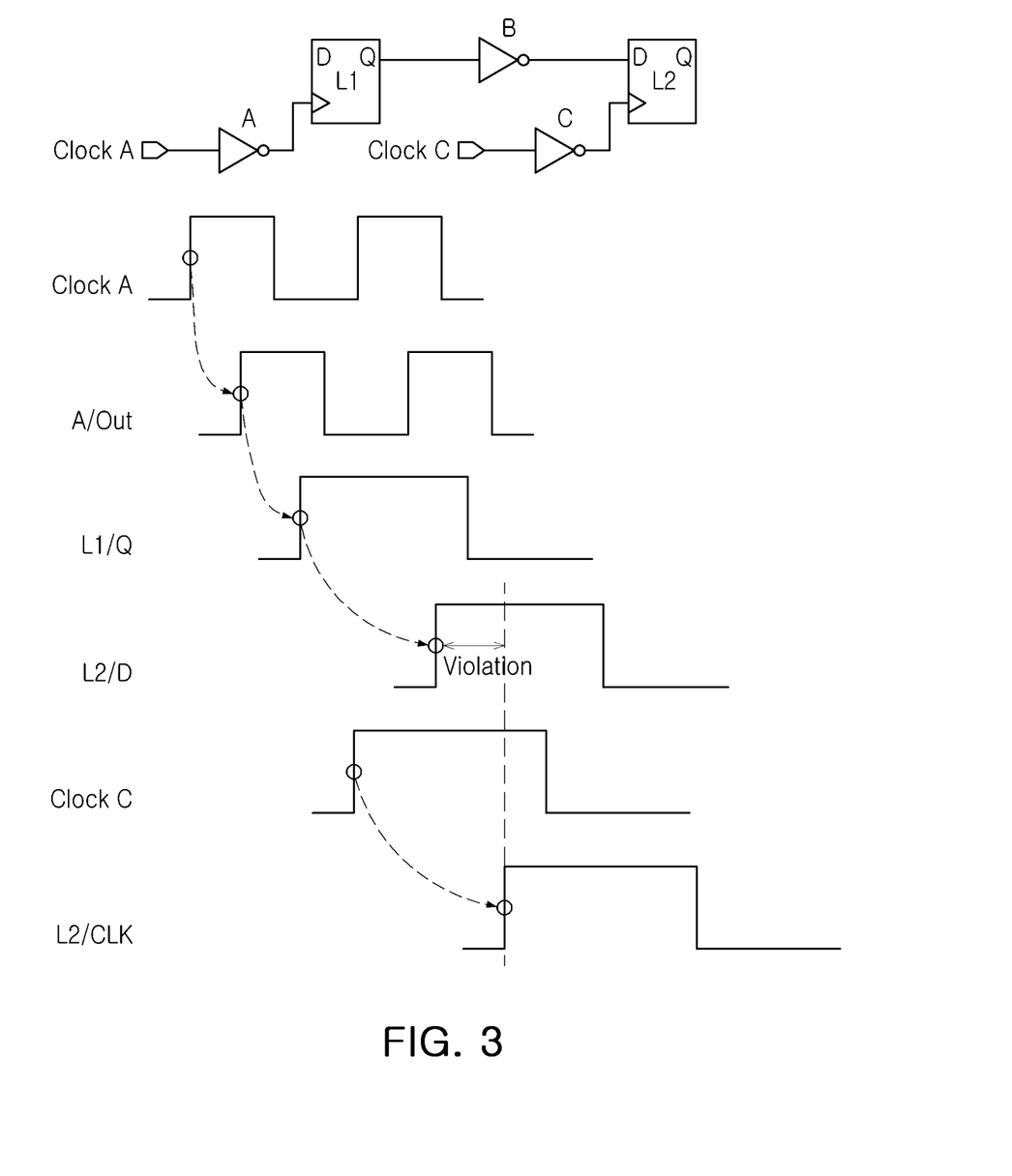
FIG. 3 is a diagram illustrating an operation of comparing CDC violation with a simulation waveform according to according to example embodiments of the present inventive concept.

FIG. 3 is a diagram illustrating an operation of comparing a CDC violation with a simulation waveform according to example embodiments of the present inventive concept. Referring to FIG. 3, a criterion for determining that the CDC violation is detected in a simulation waveform may be whether a source clock path and a destination clock path are detected. Whether the source/destination clock paths are detected, as shown in FIG. 3, may be detected by verifying that simulation transitions (changes from 0–>1 or 1–>0) correspond to all nets constituting the clock path, and whether these transitions are interconnected. For example, in FIG. 3, a violation is detected based on the clocking of the input terminal D of circuit L2 being different from the timing of the clocking of the output terminal Q of circuit L1. The difference in the timing is understood to be beyond a reasonable propagation delay and/or tolerance of the circuits.

Figure 4:
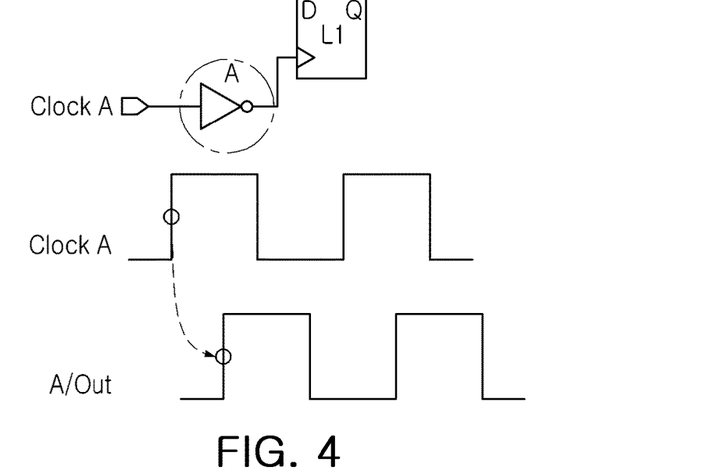
FIG. 4 is a diagram illustrating a process of determining that an output signal of an inverter is generated by transition of an input signal through waveform comparison according to example embodiments of the present inventive concept.

FIG. 4 is a diagram illustrating a process of determining that an output signal of an inverter is generated by transition of an input signal through waveform comparison according to example embodiments of the present inventive concept. Referring to FIG. 4, it may be confirmed that there is a transition in an input/output for a certain unit circuit, and that the transition of the output is generated by the transition of the input. In this case, it may be determined that the transitions are connected to a path. Whether or not connectivity is determined by checking whether a difference between the transition times of the output and the input is equal to a delay of the circuit. It may be confirmed that the source clock path and the destination clock path of the CDC violation are continuously connected for some transitions. In this case, it may be determined that a corresponding CDC violation is present in the simulation waveform. Thus, the corresponding CDC violation may be output as a valid result. In other words, this CDC violation is not noise and should be detected.

Figure 5:
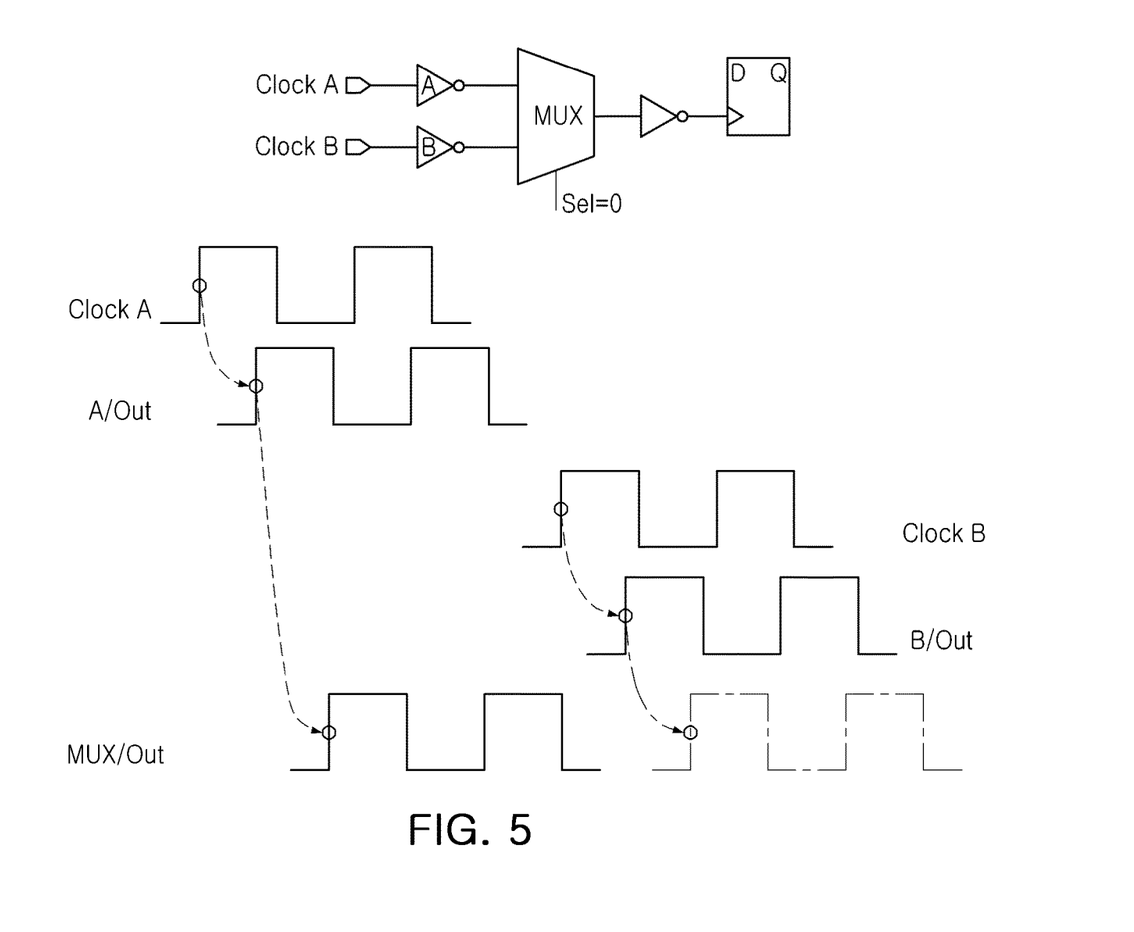
FIG. 5 is a diagram illustrating a case in which a transition is not connected to a clock path through waveform comparison according to example embodiments of the present inventive concept.

FIG. 5 is a diagram illustrating a case in which a transition is not connected to a clock path through waveform comparison according to example embodiments of the present inventive concept. Referring to FIG. 5, it is illustrated that a CDC path is not detected in a simulation waveform and thus is filtered in the CDC violation. In the case of Clock A, there is a CDC path passing through a MUX through a first inverter (A) in a simulation waveform. However, in the case of Clock B, a signal passing through a second inverter (B) is blocked in MUX, such that it is no longer propagated. In this case, connection of a transition time from Clock B to B/Out is checked, but connectivity of the transition time from B/Out to MUX/Out is not checked. In this case, a CDC path from Clock B to a clock pin of a flip-flop is filtered out of the CDC violations.

If there is a CDC violation whose component is a clock path from Clock B to the clock pin of the flip-flop, a result thereof is determined as a false result of the CDC path. Accordingly, CDC violations are filtered.

Figure 6:
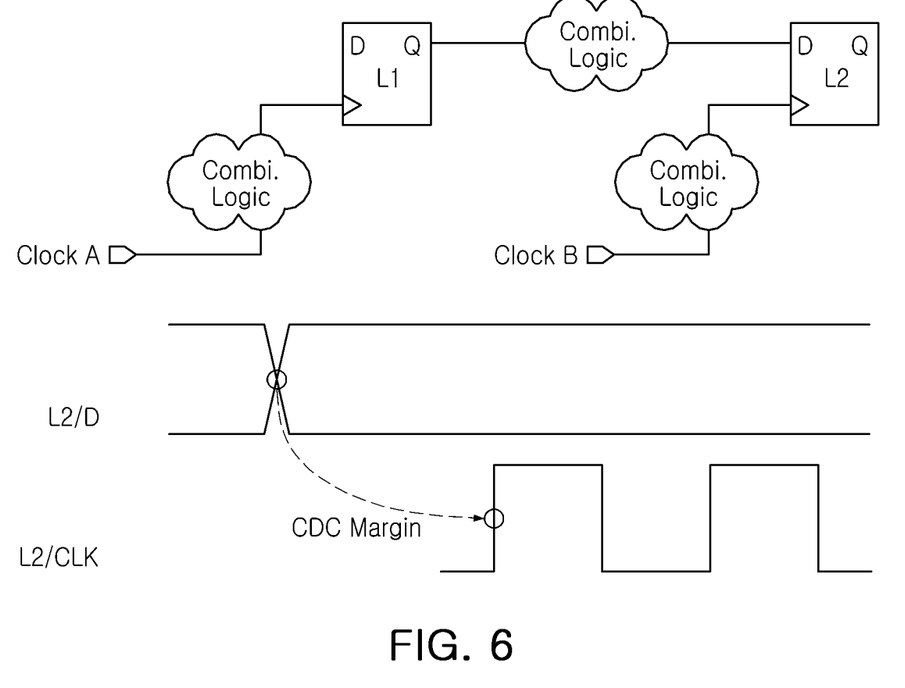
FIG. 6 is a diagram to explain a concept of a CDC margin according to according to example embodiments of the present inventive concept.

FIG. 6 is a diagram to illustrate a concept of a CDC margin according to example embodiments of the present inventive concept. Referring to FIG. 6, in a design based on an asynchronous clock method, there is a case in which the asynchronous clock is operated with a sufficient time interval. In this case, CDC points with different clocks may be detected by a static methodology as an intended operation. Nevertheless, it may be guaranteed that this CDC problem is not caused by a specification that defines a sufficiently long time between asynchronous clocks as a CDC margin.

In the same simulation waveform for each flip-flop, it may not be confirmed that the transition times of the data and clock pins are within the CDC margin. In this case, unnecessary CDC violation results may be further removed by filtering. In example embodiments, a CDC margin may be longer than a transition time margin. For example, in an LPDDR5 product, the CDC margin may be 100 ns, and a transition time margin may be 300 ps. Here, the transition time margin may be a criterion for determining whether the transition time is connected to the clock path.

Figure 7:
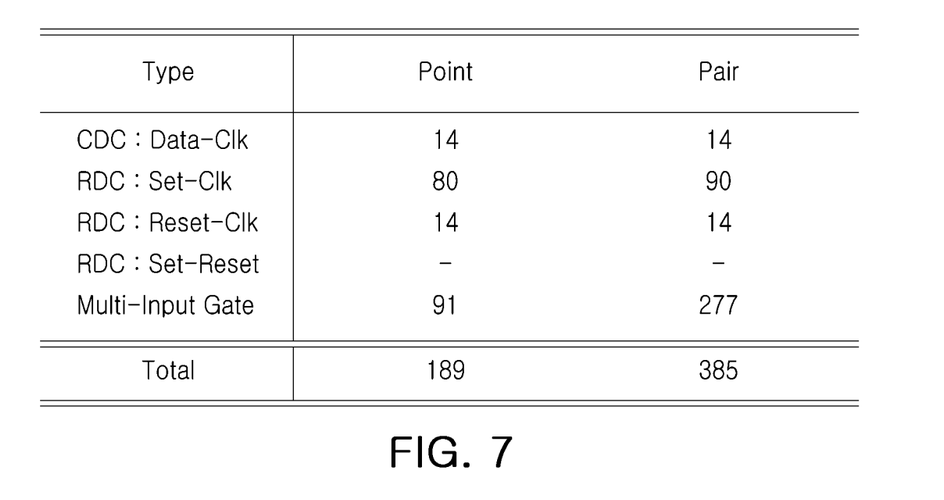
FIG. 7 is a table illustrating a result of filtering the CDC violation finally in consideration of connectivity of the CDC margin and transition time according to example embodiments of the present inventive concept.

FIG. 7 is a table illustrating a result of filtering CDC violations finally in consideration of connectivity of a CDC margin and a transition time according to example embodiments of the present inventive concept. Referring to FIG. 7, when filtering CDC violations for one simulation waveform, about 99.9% of the noise of static CDC verification violations may be removed. The number of remaining CDC violations is 385 in the example of FIG. 7.

Figure 8:
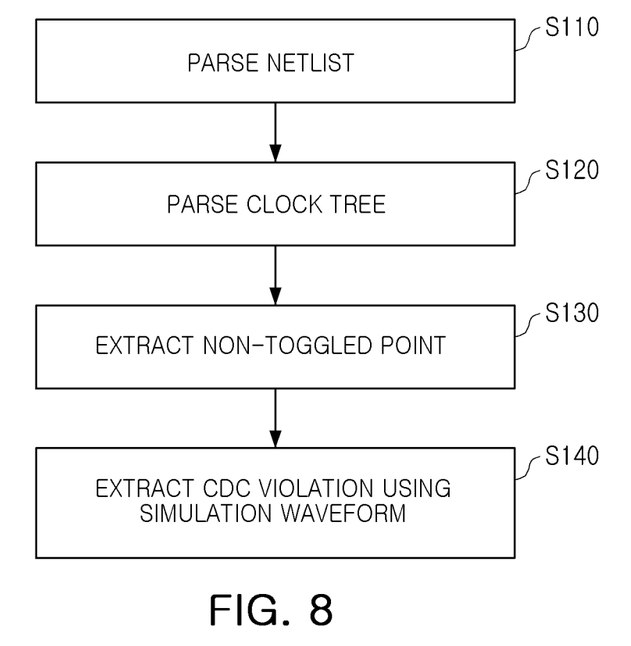
FIG. 8 is a flowchart illustrating a method of operating a computing device for CDC verification according to example embodiments of the present inventive concept.

FIG. 8 is a flowchart illustrating a method of operating a computing device for CDC verification according to example embodiments of the present inventive concept. Referring to FIGS. 1 to 8, a CDC verification operation may proceed as follows.

By parsing a Netlist, a circuit database (DB) related to CDC violations may be constructed. By setting a power supply of a corresponding circuit and parsing the Netlist, a topology may be recognized (S110). A clock tree DB may be constructed. A clock tree may be parsed based on a circuit DB (S120). A false path DB may be constructed. A non-toggled point for a target simulation waveform may be extracted using the clock tree DB (S130). Thereafter, a vector-driven CDC verification may be performed. The CDC violation identified in the simulation waveform may be extracted using the clock tree DB and the false path DB (S140).

In example embodiments, a simulation waveform may be output by parsing a Netlist by a simulation tool. In example embodiments, when parsing a clock tree, CDC points may be tracked in a static mode. In example embodiments, a non-toggled point for a target simulation waveform may be extracted using the clock tree DB. In example embodiments, a final CDC violation may be extracted by performing a vector driven CDC verification.

A CDC verification technique of the memory design of the present inventive concept may be applied without affecting the existing design methodology. In example embodiments, the CDC verification method of the present inventive concept may solve the problem of the difficulty to apply Static Timing Analysis (STA) because of a complicated clock scheme of the asynchronous circuit and the CDC violation noise being generated in large quantities.

Figure 9:
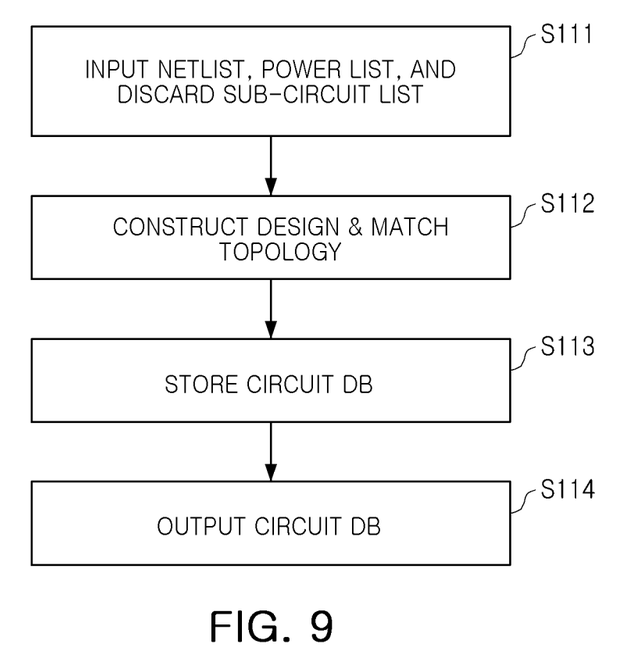
FIG. 9 is a flowchart illustrating a process (S110) of parsing a Netlist according to example embodiments of the present inventive concept.

FIG. 9 is a flowchart illustrating a process (S110 of FIG. 8) of parsing a Netlist according to example embodiments of the present inventive concept. Referring to FIG. 9, a process of parsing the Netlist may proceed as follows. A Netlist, a power list, and a discard sub-circuit list may be input (S111). A Netlist circuit design may be constructed, and a topology of a layout may be matched (S112). In this manner, a circuit database DB may be stored (S113). A circuit DB may be output (S114).

In general, a clock tree may be designed through an equalization process that minimizes latency from the clock source to the point of use, and a skew, which is a difference between clock arrival times at various points in an integrated circuit. During the design process, various variables of the clock tree may be adjusted through multiple repetitions to meet the timing requirements and constraints of the clock tree.

Figure 10:
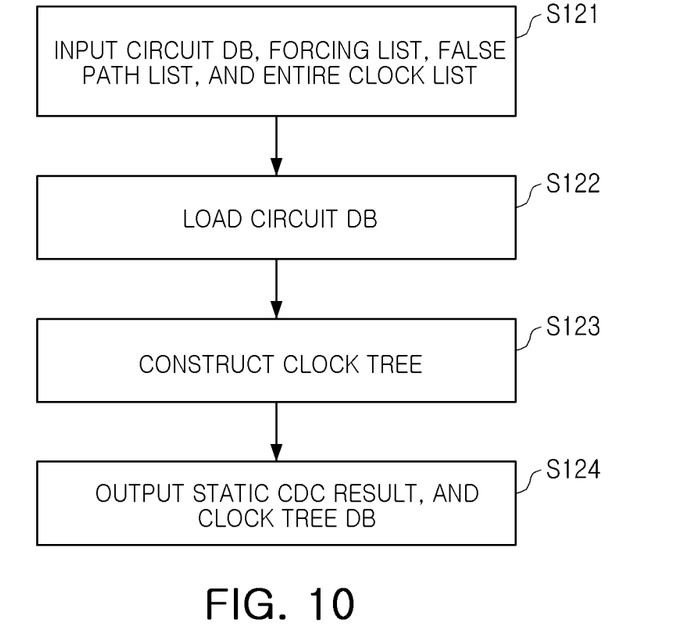
FIG. 10 is a flowchart illustrating a process (S120) of constructing a clock tree database according to example embodiments of the present inventive concept.

FIG. 10 is a flowchart illustrating a process (S120 of FIG. 8) of constructing a clock tree DB according to example embodiments of the present inventive concept. Referring to FIG. 10, a process of constructing the clock tree DB may proceed as follows. The circuit DB constructed in FIG. 9, the clock described in a specification of the circuit, and various constraints (e.g., a forcing list, a false path list) may be input (S121). A circuit DB may be uploaded (S122). By propagating clocks according to the specification of the circuit, a clock tree may be constructed (S123). Based on the constructed clock tree, static CDC results and clock tree are included in the circuit database and/or the clock tree DB. The clock tree DB constructed in this manner may be stored and output (S124).

Figure 11:
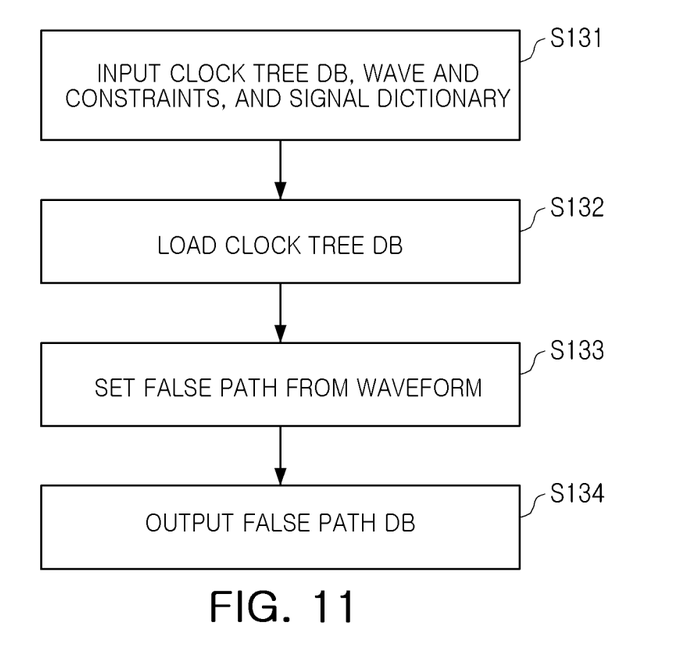
FIG. 11 is a flowchart illustrating a process (S130) of constructing a false path database according to example embodiments of the present inventive concept.

FIG. 11 is a flowchart illustrating a process (S130 of FIG. 8) of constructing a false path DB according to example embodiments of the present inventive concept. Referring to FIG. 11, a process of constructing the false path DB may be performed as follows. The clock tree DB constructed in FIG. 10, the simulation result waveform, various constraints, and a signal dictionary for signal mismatch between the simulation waveform and the circuit DB may be input (S131). A clock tree DB may be loaded (S132). After loading the clock tree DB, a false path may be set for signals that do not move (or do not operate) in the waveform (S133). A false path DB may be constructed and stored using such false path information (S134).

Figure 12:
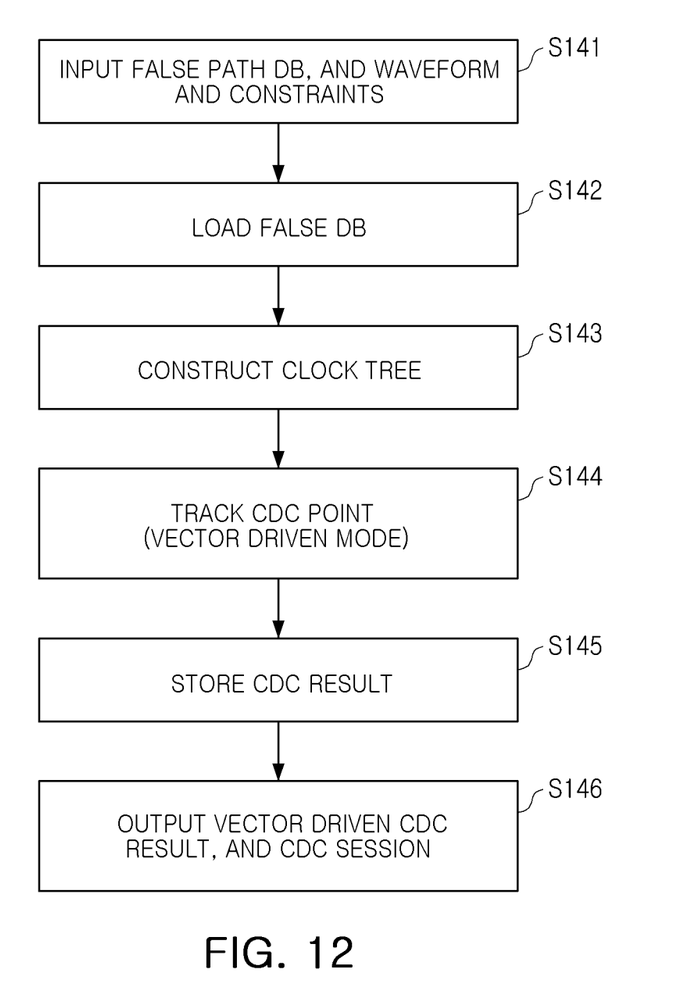
FIG. 12 is a flowchart illustrating a process (S140) of executing a vector-driven CDC according to example embodiments of the present inventive concept.

FIG. 12 is a flowchart illustrating a process (S140 of FIG. 8) of executing vector-driven CDC verification according to example embodiments of the present inventive concept. Referring to FIG. 12, a process of executing vector-driven CDC verification may proceed as follows. A false path DB, a waveform, and constraints constructed in FIG. 11 may be input (S141). The false path DB may be loaded (S142). After loading the false path DB, the clock tree may be reconstructed (S143). In this case, the process of constructing a clock tree is similar to the process of constructing the clock tree in FIG. 10, except that a temporary path is added. Points at which CDC is statically generated based on the constructed clock tree, that is, the CDC point, may be tracked (S144). For example, a backtrace (a reverse order of a direction propagated from a clock, that is, traced to a starting point of the clock) may proceed from the CDC point. When backtraced, referring to the simulation waveform, a path may be constructed along a signal in which an actual operation is followed. In conclusion, the path leading to the clock by backtrace from the CDC point is an intrinsic clock tree path that may be judged to be actually operating in the simulated waveform. In this case, the operation mode may be a vector driving mode. Intrinsic CDC paths and sessions present in the simulation result (vector) may be created and stored as a result (S145). Thereafter, the vector driven CDC verification result and the CDC session may be output (S146).

In general, Electronic Design Automation (EDA) is a software application that a designer/manufacturer may use to design an electronic device. Many software applications are available to design, simulate, parse, and verify electronic devices prior to fabrication of integrated circuits or semiconductor substrates.

Figure 13:
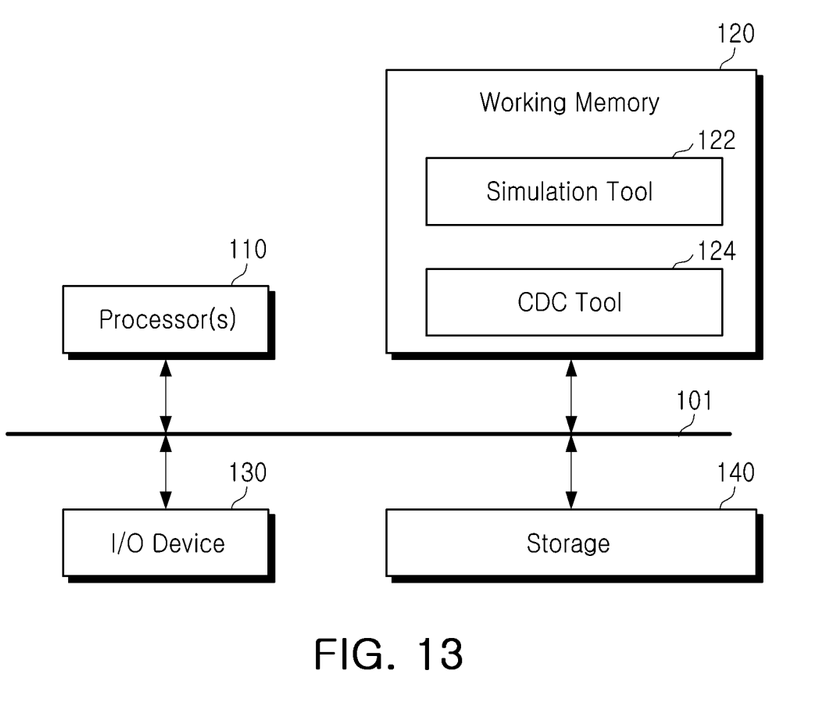
FIG. 13 is a block diagram illustrating a computing device for driving an EDA according to example embodiments of the present inventive concept.

FIG. 13 is a block diagram illustrating a computing device for driving an EDA according to example embodiments of the present inventive concept. Referring to FIG. 13, a computing device 100 may include at least one processor 110, a working memory 120, an input/output device 130, and a storage device 140. Here, the computing device 100 may be provided as a dedicated device for design. The computing device 100 may be configured to drive various designs and verification simulation programs as discussed herein with respect to FIGS. 1-12.

The processor 110 may be implemented to execute software to be executed in the computing device 100. The processor 110 may execute an operating system (OS) loaded into the working memory 120. The processor 110 may execute various application programs to be driven based on an operating system (OS). In example embodiments, the processor 110 may execute an RTL synthesis tool, a deployment tool, a clock tree synthesis tool, a routing tool, a verification tool, a Netlist simulation tool 122 and/or a CDC tool 124.

The working memory 120 may load an operating system (OS) or application programs. When the computing device 100 is booted, an OS image stored in the storage device 140 may be loaded into the working memory 120 according to a booting sequence. All input/output operations of the computing device 100 may be supported by the operating system (OS). In particular, the Netlist simulation tool 122 and the CDC tool 124 of the present inventive concept may be loaded from the storage device 140 into the working memory 120.

The working memory 120 may include a volatile memory such as a static random access memory (SRAM) or a dynamic random access memory (DRAM). Meanwhile, the working memory 120 is not limited thereto, and may include non-volatile memories such as a phase-change RAM (PRAM), a magnetic RAM (MRAM), a resistance RAM (ReRAM), a ferroelectric RAM (FRAM), and/or a flash memory.

The input/output device 130 may be implemented to control a user's input and output from user's interface devices. For example, the input/output device 130 may include a keyboard or a monitor to receive information from a designer. Using the input/output device 130, a designer may receive information about a semiconductor region or data paths requiring adjusted operating characteristics. Through the input/output device 130, a processing process and a process result of the simulation tool and the CDSC tool may be output to a display.

The storage device 140 may be provided as a storage medium of the computing device 100. The storage device 140 may store application programs (AP), an operating system image, and various data. The storage device 140 may be provided as a memory card (multimedia card (MMC), embedded MMC (eMMC), secure digital (SD), MicroSD, or the like) or a hard disk drive (HDD). The storage device 140 may include a NAND-type flash memory having a mass storage function. According to some embodiments, the storage device 140 may also include a next-generation non-volatile memory such as PRAM, MRAM, ReRAM, FRAM, or NOR flash memory.

The system bus 101 may provide a network inside the computing device 100. At least one processor 110, the working memory 120, the input/output device 130, and the storage device 140 may be electrically connected through the system bus 101, and data may be exchanged with each other.

A computer program product for electronic design automation in designing a memory device according to example embodiments of the present inventive concept includes a processor executing at least one instruction, and a memory storing the at least one instruction. The at least one instruction may be executed in a processor to parse a Netlist to output a circuit database, parse a clock tree using the circuit database to output a clock tree database, extract non-toggled points using the clock tree database to output a false path database, and extract a clock domain crossing (CDC) violation identified in a simulation waveform using the clock tree database and the false path database.

The at least one instruction may be executed in the processor to filter a CDC violation from which a CDC path is not detected in the simulation waveform from CDC violations detected in static timing analysis.

In example embodiments, at least one instruction may be executed in a processor to filter a CDC violation from which a CDC path is not detected, in a simulation waveform from CDC violations detected in static timing analysis. In example embodiments, the at least one instruction may be executed in the processor to detect a false path using connectivity of a transition time. In example embodiments, the at least one instruction may be executed in a processor to determine connectivity of a clock path of the transition time using a CDC margin and a transition time margin.

As set forth above, according to example embodiments of the present inventive concept, in a computing device for detecting clock domain crossing violation in a design of a memory device, and a method having the same, CDC violation noise may be significantly reduced by extracting a CDC violation in a simulation waveform of Netlist analysis.

While example embodiments have been shown and described above, it will be apparent to those skilled in the art that modifications and variations could be made without departing from the scope of the present inventive concept.

What is claimed is:

1. A method of operating a computing device for detecting clock domain crossing (CDC) violation in a design of a memory device, the method comprising executing, by a processor, computer readable program instructions stored in a non-transitory memory of the memory device to perform operations comprising:
    parsing a Netlist to generate a circuit database;
    parsing a clock tree using the circuit database to generate a clock tree database;
    extracting a non-toggled point using the clock tree database to generate a false path database based on the non-toggled point; and
    extracting a CDC violation identified from one or more simulation waveforms using the clock tree database and the false path database.

2. The method of claim 1, wherein the one or more simulation waveforms are determined by parsing the Netlist by a simulation tool.

3. The method of claim 1, wherein the parsing the Netlist comprises operations comprising:
    receiving, by the computing device, the Netlist, a power supply list, and a discard sub-circuit list;
    matching circuit design construction and topology using the Netlist, the power supply list, and the discard sub-circuit list;
    storing the circuit database; and
    generating the circuit database.

4. The method of claim 1, wherein the parsing the clock tree comprises:
    tracking CDC points in a static mode.

5. The method of claim 1, wherein the parsing the clock tree comprises:
    receiving the circuit database, a forcing list, a false path list, and an entire clock list;
    loading the circuit database;
    constructing the clock tree;
    tracking CDC points in the clock tree; and
    determining static CDC results and the clock tree database.

6. The method of claim 1, wherein the extracting the non-toggled point comprises:
    extracting the non-toggled point for a target simulation waveform using the clock tree database.

7. The method of claim 1, wherein the extracting the non-toggled point comprises:
    receiving the clock tree database and the one or more simulation waveforms;
    loading the clock tree database;
    setting a false path based on the one or more simulation waveforms; and
    generating the false path database based on the false path.

8. The method of claim 1, wherein the extracting the CDC violation comprises:
    extracting the CDC violation by performing a vector driven CDC verification.

9. The method of claim 1, wherein the extracting the CDC violation comprises:
    receiving the false path database, the one or more simulation waveforms and constraints;
    loading the false path database;
    constructing the clock tree based on the false path database, the one or more simulation waveforms, and the constraints;
    tracking CDC points in a vector driven mode;
    storing the CDC points that were tracked; and
    determining vector driven CDC verification results.

10. The method of claim 1, wherein the extracting the CDC violation comprises:
    detecting a CDC violation path in the one or more simulation waveforms by matching the one or more simulation waveforms parsed by a simulation tool with the CDC violation based on static timing analysis performed by a CDC tool.

11. A computing device for implementing electronic design automation in a design of a memory device, the computing device comprising:
    a processor configured to execute a simulation tool and a clock domain crossing (CDC) tool, wherein the simulation tool and the CDC tool comprise computer readable program instructions;
    a storage device configured to store the simulation tool and the CDC tool;
    a working memory configured to load the simulation tool and the CDC tool stored in the storage device; and
    an input/output device configured to output a result of the simulation tool and the CDC tool that were executed to the processor,
    wherein the processor is configured to exclude from CDC analysis by the CDC tool, a point without a toggle of a signal by parsing a Netlist by the simulation tool, detect CDC violations by performing static timing analysis in the CDC tool, and detect a CDC violation path by matching a simulation waveform according to analysis of the simulation tool to the CDC violations detected by the CDC tool.

12. The computing device of claim 11,
    wherein when different clocks arrive at a first pin and a second pin of a target circuit of the computing device via corresponding synchronization circuits for different first and second clocks, the CDC tool determines that the synchronization circuits are a CDC violation.

13. The computing device of claim 12,
wherein the processor is configured to determine detection of the CDC violation in the simulation waveform based on whether a source clock path and a destination clock path are detected,
wherein the source clock path is a path from a first clock to the first pin, and
wherein the destination clock path is a path from a second clock to the second pin.

14. The computing device of claim 13, wherein the processor is configured to detect the source clock path or the destination clock path by determining whether transitions in the simulation waveform correspond to all nets of the source clock path or all nets of the destination clock path, and based on whether transitions in the source clock path or the destination clock path are interconnected.

15. The computing device of claim 14, wherein when a transition time of data and a clock pin in the simulation waveform is not within a CDC margin, the processor is configured to filter a corresponding CDC violation from the CDC violations.

16. A computer program product comprising:
a non-transitory memory configured to store at least one instruction,
wherein the computer program product comprises the at least one instruction;
wherein the at least one instruction is executable by a processor to perform operations comprising:
parsing a Netlist to generate a circuit database;
parsing a clock tree using the circuit database to generate a clock tree database;
extracting a non-toggled point using the clock tree database to generate a false path database based on the non-toggled point; and
extracting a clock domain crossing (CDC) violation identified from one or more simulation waveforms using the clock tree database and the false path database.

17. The computer program product of claim 16,
wherein when the at least one instruction is executable by the processor to filter a corresponding CDC violation of a plurality of CDC violations for which a CDC path is not detected in the simulation waveform,
wherein the CDC violations were detected in static timing analysis.

18. The computer program product of claim 17,
wherein the at least one instruction is executable by the processor to detect a false path based on connectivity within a transition time, and
wherein the connectivity is determined by checking whether a difference between the transition time of an output and an input of a circuit is equal to a delay of the circuit in the CDC path.

19. The computer program product of claim 16, wherein the at least one instruction is executable by the processor to determine clock path connectivity within a transition time using a CDC margin and a transition time margin.

20. The computer program product of claim 19, wherein the CDC margin is longer than the transition time margin.

* * * * *